(12) United States Patent
Franke et al.

(10) Patent No.: US 11,926,303 B2
(45) Date of Patent: Mar. 12, 2024

(54) SPRING-LOADED NON-RETURN VALVE FOR A VEHICLE HYDRAULIC-POWER BRAKE SYSTEM, AND VEHICLE POWER-BRAKE SYSTEM HAVING THE NON-RETURN VALVE

(71) Applicant: Robert Bosch GmbH, Stuttgart (DE)

(72) Inventors: Tobias Franke, Missen (DE); Andreas Weh, Sulzberg (DE); Martin Hagspiel, Rettenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 176 days.

(21) Appl. No.: 17/365,813

(22) Filed: Jul. 1, 2021

(65) Prior Publication Data

US 2022/0055585 A1 Feb. 24, 2022

(30) Foreign Application Priority Data

Aug. 21, 2020 (DE) .......................... 102020210651.7

(51) Int. Cl.
*B60T 8/36* (2006.01)
*B60T 8/34* (2006.01)
*B60T 8/48* (2006.01)

(52) U.S. Cl.
CPC .............. *B60T 8/368* (2013.01); *B60T 8/341* (2013.01); *B60T 8/4872* (2013.01)

(58) Field of Classification Search
CPC ......... B60T 8/368; B60T 8/341; B60T 8/4872
See application file for complete search history.

(56) References Cited

U.S. PATENT DOCUMENTS

| | | | | |
|---|---|---|---|---|
| 4,310,018 A * | 1/1982 | Parr | ...................... | F16K 15/044 137/539.5 |
| 5,353,834 A * | 10/1994 | Schmitt | ................. | F16K 15/044 137/539.5 |
| 6,113,365 A * | 9/2000 | Siegel | ................... | B60T 8/4031 417/434 |
| 6,244,295 B1* | 6/2001 | Bartussek | ............. | F16K 15/044 137/540 |
| 6,805,157 B2* | 10/2004 | Nakazawa | ............ | B60T 8/4031 137/540 |
| 2007/0057572 A1* | 3/2007 | Hinz | ....................... | B60T 8/363 303/119.2 |

(Continued)

FOREIGN PATENT DOCUMENTS

DE 4236481 A1 5/1994

OTHER PUBLICATIONS

German Patent No. DE 102013221051 published on Apr. 23, 2015 to Dinerman et al.*

(Continued)

*Primary Examiner* — Pamela Rodriguez
(74) *Attorney, Agent, or Firm* — NORTON ROSE FULBRIGHT US LLP; Gerard A. Messina

(57) ABSTRACT

A non-return valve for a vehicle hydraulic-power brake system. The non-return valve has a valve-seat part in the form of an apertured disk, onto which is pressed a valve cage in which a valve ball is disposed as shut-off member and a helical compression spring is disposed as valve spring. A bowl-shaped filter is secured in a depression in the valve-seat part opposite the valve cage.

16 Claims, 2 Drawing Sheets

(56) References Cited

U.S. PATENT DOCUMENTS

2009/0242049 A1* 10/2009 Yamashita .............. F04B 17/03
  137/565.15
2012/0222759 A1* 9/2012 Knis ....................... F16K 15/04
  137/512.2
2022/0178455 A1* 6/2022 Lechler ............... F16K 17/0406

OTHER PUBLICATIONS

WO document No. 2017/182174 published on Oct. 26, 2017 to Guggenmos et al.*

* cited by examiner

SPRING-LOADED NON-RETURN VALVE FOR A VEHICLE HYDRAULIC-POWER BRAKE SYSTEM, AND VEHICLE POWER-BRAKE SYSTEM HAVING THE NON-RETURN VALVE

CROSS REFERENCE

The present application claims the benefit under 35 U.S.C. § 119 of German Patent Application No. DE 102020210651.7 filed on Aug. 21, 2020, which is expressly incorporated herein by reference in its entirety.

FIELD

The present invention relates to a spring-loaded non-return valve for a vehicle hydraulic-power brake system, and a hydraulic block for a hydraulic modulator of a vehicle hydraulic-power brake system with the non-return valve.

BACKGROUND INFORMATION

German Patent No. 42 36 481 C2 describes a non-return valve having a ball as shut-off member, a rotationally symmetric valve-seat part that has an axial through-hole having a hollow frusto-conical valve seat at an outlet of the through-hole, a valve spring which presses the shut-off member against the valve seat, and a valve cage in which the shut-off member and the valve spring are disposed and on which the valve spring is supported. The valve cage of the conventional non-return valve is a sheet-metal part having a bottom in the shape of a circular disk on which the valve spring is supported, and three axially parallel arms that extend at a periphery outside of the valve spring and outside of the shut-off member, from the bottom of the valve cage to the valve-seat part. At their free ends, the arms of the valve cage are T-shaped and lie elastically in a circumferential groove at the outer circumference of the valve-seat part. A mounting in the form of a cylinder hole in a hydraulic block retains the T-shaped ends of the arms of the valve cage in the circumferential groove of the valve-seat part.

SUMMARY

In accordance with an example embodiment of the present invention, the non-return valve according to the present invention is provided for a vehicle hydraulic-power brake system, where it is disposed between a brake-fluid reservoir and a piston-cylinder unit of a power brake-pressure generator, for example, or between the brake-fluid reservoir and a hydraulic pump/return pump of a slip control.

The non-return valve according to an example embodiment of the present invention has a valve-seat part having a valve seat, a shut-off member, a valve spring which presses the shut-off member against the valve seat, and a valve cage that is disposed on the valve-seat part and in which the shut-off member and the valve spring are located. The valve seat is a sealing surface that surrounds a fluid opening in the non-return valve and against which the shut-off member abuts when the valve is in the closed state in order to prevent the passage of fluid—in a through-flow direction in the case of a non-return valve. When the non-return valve is open, the shut-off member is lifted off of the valve seat, so that fluid is able to flow through the fluid opening of the non-return valve. The valve cage is a hollow body which may also have large-area openings and which, when the non-return valve is open, secures the shut-off member in such a way that upon closure of the non-return valve, it arrives again on the valve seat. In addition, the valve cage retains the valve spring.

The valve-seat part of the non-return valve according to the invention has an elevation, and the valve cage has an annular shoulder which changes over at its outer circumference into a tubular collar. The annular shoulder of the valve cage abuts against an end face of the elevation of the valve-seat part, and the collar has a press fit with a circumferential surface of the elevation of the valve-seat part, so that the valve cage is joined to the valve-seat part.

The non-return valve of the present invention forms a module that is able to be preassembled and whose functioning is able to be checked prior to its installation.

Further developments and advantageous refinements of the present invention are disclosed herein.

All features disclosed in the specification and the figures may be realized individually or in basically any combination in specific embodiments of the invention. Realizations of the present invention which do not have all, but rather only one or more features of a specific embodiment of the invention, are possible.

BRIEF DESCRIPTION OF THE DRAWINGS

The present invention is explained in greater detail below on the basis of a specific embodiment shown in the figures.

DETAILED DESCRIPTION OF EXAMPLE EMBODIMENTS

Figure 1:
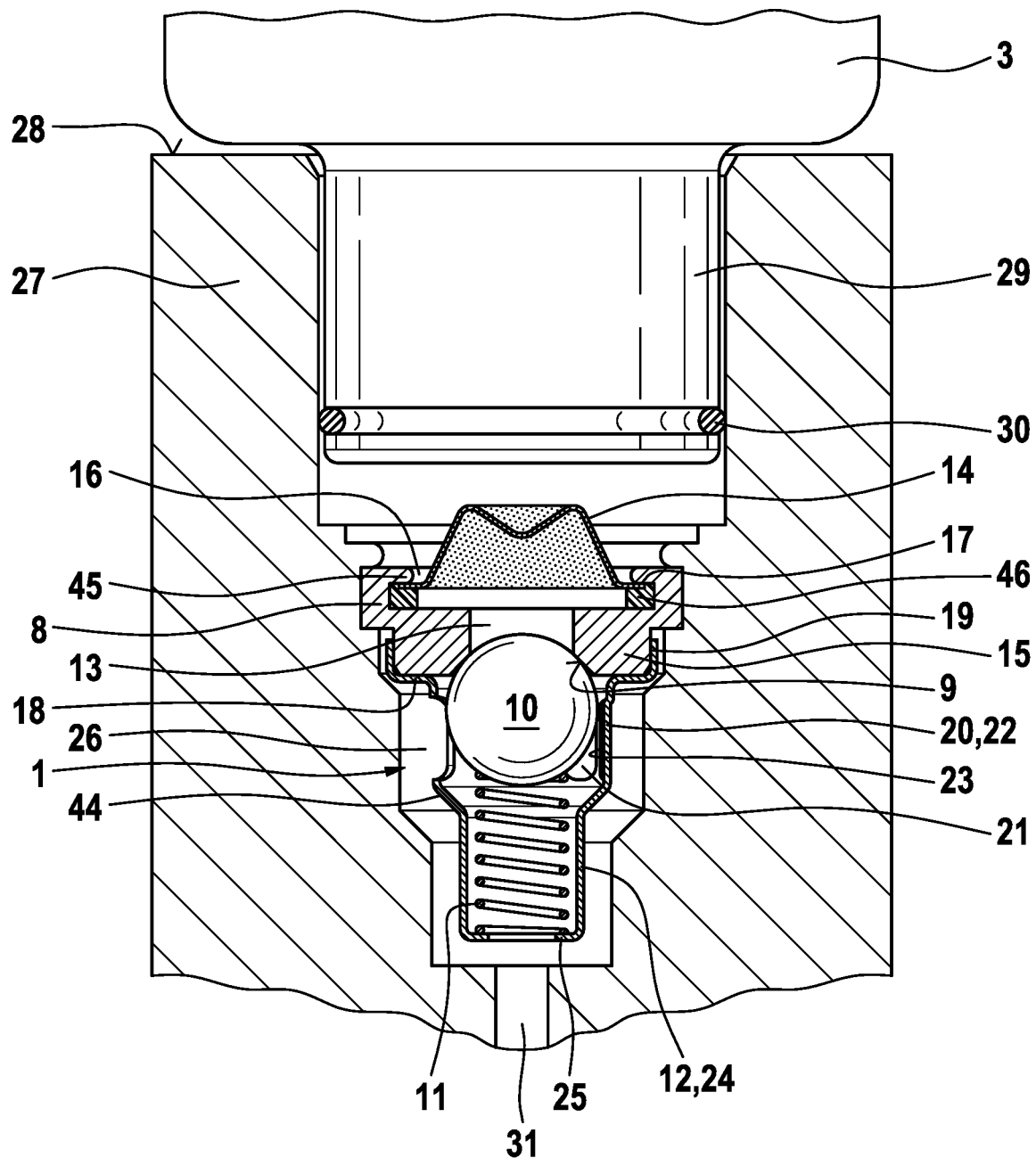
FIG. 1 shows an axial section of a non-return valve according to an example embodiment of the present invention.

Spring-loaded non-return valve 1 according to and example embodiment of the present invention shown in FIG. 1 is provided for a vehicle hydraulic-power brake system 2, and specifically, is disposed there between an unpressurized brake-fluid reservoir 3 and a cylinder 4 of a piston-cylinder unit 5 of a power brake-pressure generator 6, or between unpressurized brake-fluid reservoir 3 and a suction side of a hydraulic pump 7 of a slip control of vehicle brake system 2.

Non-return valve 1 has a valve-seat part 8 having a valve seat 9, a shut-off member 10, a valve spring 11, a valve cage 12 and a filter 14. Valve-seat part 8 has an axial through-hole 13 as fluid passage which opens out at an end face of valve-seat part 8 having a hollow frusto-conical sealing surface which forms valve seat 9. In the exemplary embodiment, valve-seat part 8 is short axially, its axial height amounting to approximately ⅓ its diameter. At its periphery, it has a diameter step with which its outside diameter decreases towards the end face at which valve seat 9 is located. An axial section, smaller in diameter, on the side of valve seat 9 forms an elevation 15 of valve-seat part 8. For reasons of cost, the valve-seat part is a molded part, particularly a massive-molding part, produced by forging or extrusion, for example. The invention does not rule out other manufacturing methods.

On an end face opposite valve seat 9, valve-seat part 8 has a cylindrical depression 16 that is stepped in diameter, at the bottom of which through-hole 13 opens out.

Filter 14 in the exemplary embodiment is a bowl-shaped hollow body made of wire cloth, whose bottom is arched into filter 14. A circumferential edge of filter 14 is formed into a mounting flange 17 in the shape of an annular disk, on which a plastic ring is extruded from the hollow side of filter 14 as mount 46.

Filter 14 rests with the mount on a bottom of depression 16 of valve-seat part 8. A circumferential caulking 45, which engages over mount 46 of filter 14, retains the filter in depression 16 of valve-seat part 8. The hollow side of filter 14 faces the bottom of depression 16.

Shut-off member 10 in the exemplary embodiment is a ball made of steel, some other metal or plastic. Shut-off members of a different shape and a possibly adapted valve seat 9 (not shown) are not ruled out.

Valve spring 11 in the exemplary embodiment is a helical compression spring that is disposed coaxially relative to valve-seat part 8, valve seat 9 and shut-off member 10, and which presses shut-off member 10 against valve seat 9. As said, valve seat 9 is a sealing surface against which shut-off member 10 abuts when non-return valve is in the closed state, and thereby blocks axial through-hole 13 forming the fluid passage in valve-seat part 8, and consequently non-return valve 1, against the passage of fluid. Non-return valve 1 is opened by a differential pressure which is so much greater on the side of filter 14 than on an opposite side, that it lifts the shut-off member from valve seat 9 counter to a spring force of valve spring 11.

Valve cage 12 is a tubular part having a diameter changing over its axial length. In the exemplary embodiment, valve cage 12 is deep-drawn from sheet metal, with other materials and/or types of manufacturing being possible. At an end facing valve-seat part 8, valve cage 12 has an annular shoulder 18 which changes over at its outer periphery into an axially short, cylindrical tube-shaped collar 19. Collar 19 has an inside diameter somewhat smaller than an outside diameter of elevation 15 of valve-seat part 8. Collar 19 of valve cage 12 embraces elevation 15 of valve-seat part 8 with a press fit, thereby retaining valve cage 12 on valve-seat part 8. Annular shoulder 18 of valve cage 12 abuts against an end face of elevation 15 of valve-seat part 8.

At its inner periphery, annular shoulder 18 of valve cage 12 changes over into a first cylindrical tube-shaped section 20 whose inside diameter is larger than a diameter of shut-off member 10, so that when non-return valve 1 is in the open state, fluid is able to flow out of axial through-hole 13 in valve-seat part 8 past shut-off member 10. At an axially short distance from annular shoulder 18, first cylindrical tube-shaped section 20 of valve cage 12 has large passages 21 for fluid flowing through non-return valve 1, the passages together occupying more than one half and preferably at least $2/3$ or $3/4$ a volume of first cylindrical tube-shaped section 20. The axial distance of passages 21 from annular shoulder 18 amounts to less than $1/10$ the diameter of first cylindrical tube-shaped section 20 and less than a maximum lift of shut-off member 10, meaning a maximum distance of shut-off member 10 from valve seat 9 when non-return valve 1 is in the open state. As a consequence, when non-return valve 1 is open, fluid does not have to flow around shut-off member 10, but rather is able to flow out past it through passages 21 with little flow resistance.

Between passages 21, valve cage 12 has axially parallel webs 22 on which axially parallel beads 23 are formed to the inside, that guide shut-off member 10 axially.

At an end of first cylindrical tube-shaped section 20 remote from annular shoulder 18, valve cage 12 narrows—conically in the exemplary embodiment—into a second cylindrical tube-shaped section 24 having a smaller diameter, which at its end remote from collar 19, is shaped into a cage bottom 25 in the form of an apertured disk, on which valve spring 11 is supported.

Smaller-diameter second cylindrical tube-shaped section 24 of valve cage 12 guides valve spring 11 and buttresses it against lateral buckling. Narrowing 44 of valve cage 12 forms a travel limitation which limits a maximum travel, thus, a maximum distance shut-off member 10 is removable from valve seat 9.

Narrowing 44 does not have to be conical, but may also be implemented as a radial annular shoulder (not shown), for example.

Non-return valve 1 according to the invention is realized as a preassembly unit whose individual parts—valve-seat part 8 together with filter 14 on the one side and valve cage 12 in which shut-off member 10 and valve spring 11 are located on the other side—may be assembled and checked for functionality prior to inserting non-return valve 1 into a non-return-valve mounting 26 of a hydraulic block 27. Filter 14 prevents shavings, abraded matter, dirt contamination, etc., developing during subsequent processing steps and/or assembly operations, from falling through through-hole 13 of valve-seat part 8 onto shut-off member 10 and getting onto valve seat 9.

Non-return valve 1 is disposed in non-return-valve mounting 26 of hydraulic block 27 according to the present invention, of which an area surrounding non-return valve 1 is shown in FIG. 1. Hydraulic block 27 is a cuboidal metal block with mountings for hydraulic components of vehicle brake system 2 and its slip control such as power brake-pressure generator 6, hydraulic pump 7 and solenoid valves, which are disposed in mountings in hydraulic block 27 and are interconnected through bore holes in hydraulic block 27 according to a hydraulic circuit diagram of vehicle brake system 2. Fitted with the hydraulic components, hydraulic block 27 forms a hydraulic modulator of vehicle power-brake system 2 and its slip control. Such hydraulic blocks 27 and hydraulic modulators of vehicle hydraulic-power brake systems and slip controls of vehicle hydraulic brake systems are familiar and are not explained in greater detail here.

Hydraulic block 27 has a hole, stepped in diameter, in a side denoted here as upper side 28, into which projects a connecting nipple 29 of unpressurized brake fluid reservoir 3 which is located on upper side 28 of hydraulic block 27 and of which only a fragment in the area of a reservoir bottom is shown in FIG. 1. Connecting nipple 29 is sealed by an O-ring 30 in the hole in hydraulic block 27.

Non-return valve 1 is disposed in the hole below connecting nipple 29, an annular shoulder of valve-seat part 8 surrounding elevation 15 of valve-seat part 8 resting axially on a circumferential annular step of the hole in hydraulic block 27. A conduit bore 31 leads from a bottom of the hole in hydraulic block 27 to cylinder 4 of piston-cylinder unit 5 of power brake-pressure generator 6, for example. The hole, or rather a part of the hole in which non-return valve 1 is disposed, forms non-return-valve mounting 26 in hydraulic block 27.

A diameter of non-return valve 1, that is, of valve-seat part 8 at which non-return valve 1 has a largest outside diameter, is smaller than a diameter of connecting nipple 29 of brake-fluid reservoir 3, which has a diameter of 17 mm. Non-return valve 1 is disposed co-axially relative to connecting nipple 29 in the diameter-stepped hole of hydraulic block 27 and is caulked circumferentially in pressure-tight fashion in the hole using a tubular punch (not shown). During the caulking, the punch is centered in the hole or at an outlet of the hole in hydraulic block 27.

Figure 2:
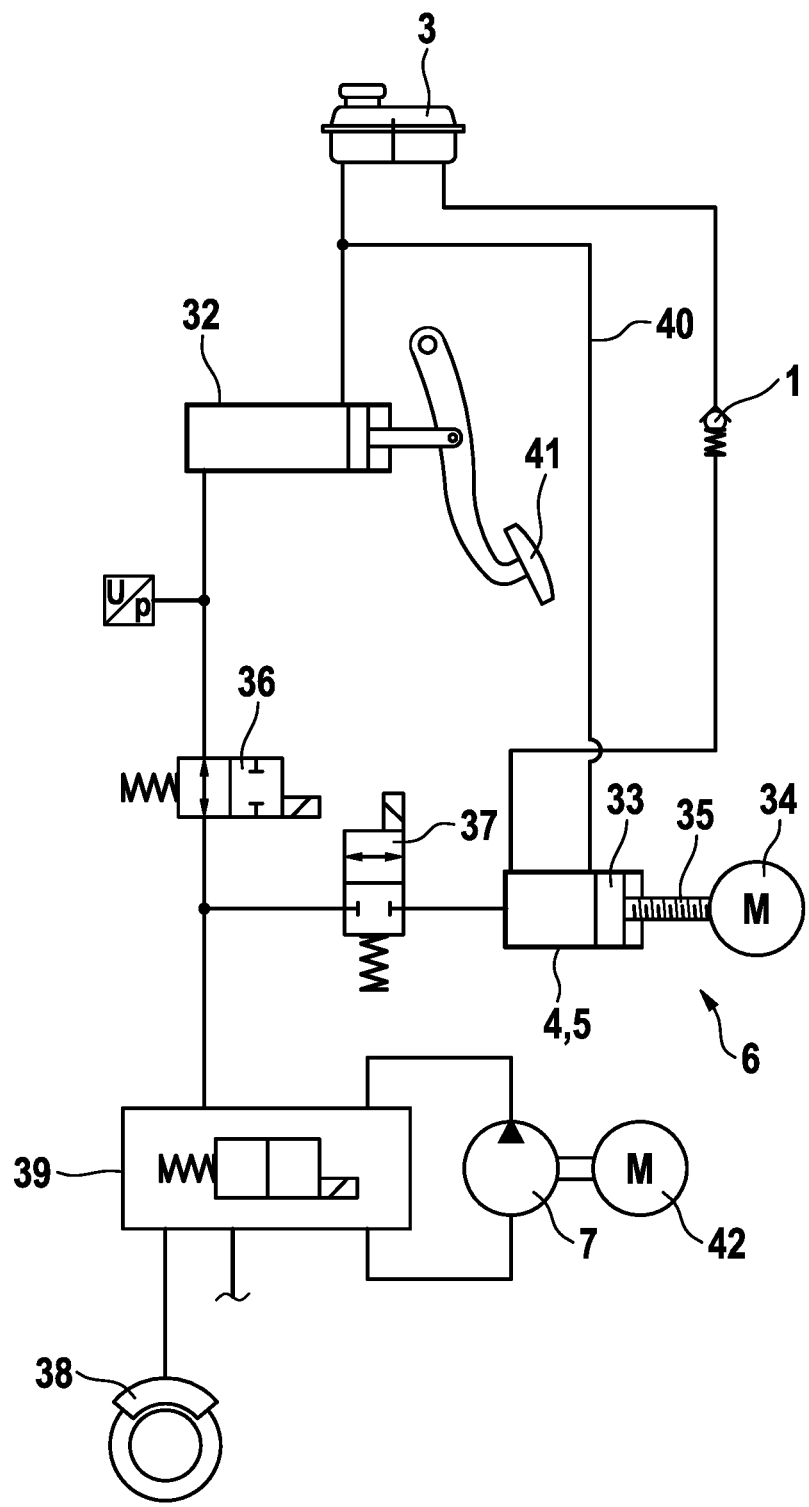
FIG. 2 shows a section of a hydraulic circuit diagram of a vehicle hydraulic-power brake system having the non-return valve from FIG. 1.

FIG. 2 shows a simplified section of a hydraulic circuit diagram of vehicle hydraulic-power brake system 2 in which non-return valve 1 of the present invention is used. Vehicle brake system 2 has a brake master cylinder 32 operable by muscular energy with the aid of a foot-brake pedal 41 or with the aid of a handbrake lever (not shown), and power brake-pressure generator 6 to which the brake circuit(s) (one brake circuit is shown) of vehicle brake system 2 is/are connected hydraulically in parallel.

As described above, power brake-pressure generator 6 has a piston-cylinder unit 5 whose piston 33 is displaceable in cylinder 4 of piston-cylinder unit 5 by external power with the aid of an electric motor 34 via a screw drive 35 in order to generate a braking pressure. A mechanical reduction gear, e.g., a planetary gear (not shown) may be disposed between electric motor 34 and screw drive 35. Other power brake-pressure generators 6, e.g., having a hydraulic pump are likewise possible (not shown).

The brake circuit or circuits of vehicle brake system 2 are connected hydraulically in parallel by one isolating valve 36 each per brake circuit to brake master cylinder 32 and by one power valve 37 each per brake circuit to cylinder 4 of piston-cylinder unit 5 of power brake-pressure generator 6, or in general, to power brake-pressure generator 6.

One or more hydraulic wheel brakes 38 is/are connected to each brake circuit of vehicle brake system 2, each wheel brake 38 being connected via one inlet valve each and one outlet valve each to the respective brake circuit for a wheel-selective brake-pressure control. In FIG. 2, the inlet valves and the outlet valves are combined to form a wheel-brake pressure-control valve assembly 39.

Cylinder 4 of piston-cylinder unit 5 of power brake-pressure generator 6 is connected to brake-fluid reservoir 3 by a brake line 40, and hydraulically in parallel to it, by non-return valve 1 according to the present invention, brake line 40 being connected to cylinder 4 in such a way that at the beginning of a piston stroke, piston 33 overrides and thereby blocks it. Non-return valve 1 is able to be traversed from the direction of brake-fluid reservoir 3 in the direction of cylinder 4 of piston-cylinder unit 5 of power brake-pressure generator 6. The connection of cylinder 4 of piston-cylinder unit 5 of power brake-pressure generator 6 to brake-fluid reservoir 3 always exists through non-return valve 1 according to the invention, so that upon a return stroke of piston 33, power brake-pressure generator 6 sucks brake fluid into cylinder 4 if a vacuum exists in cylinder 4 relative to unpressurized brake fluid reservoir 3.

A brake pressure for a service brake application is generated by power brake-pressure generator 6 and regulated by back and forth movements of piston 33 and/or by wheel-brake pressure-control valve assemblies 39. In this context, power valve(s) 37 is/are opened and brake circuit(s) of vehicle brake system 2 is/are thereby connected hydraulically to power brake-pressure generator 6. Isolating valve(s) 36 is/are closed during a service brake application, so that brake master cylinder 32 is disconnected hydraulically from the brake circuits. Brake master cylinder 32 is used as setpoint generator for the brake pressure to be generated by power brake-pressure generator 6 during a service brake application.

In the event power brake-pressure generator 6 fails, a secondary braking is possible by brake master cylinder 32 via muscular energy.

A slip control is possible utilizing the inlet valves and outlet valves of wheel-brake pressure-control valve assemblies 39 and power brake-pressure generator 6. Such slip controls include an antilock braking system, traction control system and/or vehicle dynamics control or electronic stability program, for which the abbreviations ABS, TCS and/or VDC or ESP are customary. Such slip controls are familiar and are not explained here.

For the slip control, in each brake circuit the vehicle brake system may additionally have a hydraulic pump 7, the pumps being able to be driven together by an electric motor 42. During a slip control, hydraulic pump(s) 7 pump brake fluid into wheel brakes 38 and/or back into brake master cylinder 32. This is also familiar and is not explained in greater detail here.

In the event power brake-pressure generator 6 fails, a pressure buildup with external power is possible using hydraulic pump(s) 7. If hydraulic pump(s) 7 is/are present, non-return valve 1 between brake-fluid reservoir 3 and cylinder 4 of power brake-pressure generator 6 may be omitted.

With the exception of foot-brake pedal 41 and wheel brakes 38, the hydraulic components of vehicle power-brake system 2 are accommodated in and on hydraulic block 27 according to the invention. Namely, non-return valves 1, piston-cylinder unit 5 of power brake-pressure generator 6, hydraulic pump(s) 7, isolating valve(s) 36, power valve(s) 37 and the inlet valves and outlet valves of wheel-brake pressure-control valve assemblies 39 are disposed in mountings in hydraulic block 27.

Electric motor 34 of power brake-pressure generator 6, electric motor 42 for hydraulic pump(s) 7 and foot-brake pedal 41 are disposed on the outside of hydraulic block 27, and brake-fluid reservoir 3 is mounted on upper side 28 of hydraulic block 27.

What is claimed is:

1. A spring-loaded non-return valve for a vehicle hydraulic-power brake system, comprising:
   a valve-seat part having a valve seat;
   a shut-off member;
   a valve spring which presses the shut-off member against the valve seat; and
   a valve cage that is disposed on the valve-seat part, in which the shut-off member and the valve spring are located and which supports the valve spring;
   wherein:
   the valve-seat part has an elevation, and the valve cage has an annular shoulder which abuts against an end face of the elevation and which changes over at an outer periphery of the annular shoulder into a tubular collar that has a press fit with a circumferential surface of the elevation; and
   the non-return valve includes at least one of the following features (a)-(e):
      (a) a total height of the valve-seat part is not greater than approximately one third of a maximum diameter of the valve-seat part;
      (b) the valve cage has passages that extend in a lift direction of the shut-off member, nearly up to the valve-cage annular shoulder, the passages being cutouts in a wall of the valve cage and extending from a radial interior of the valve cage to a radial exterior of the valve cage;
      (c) the end face of the elevation, against which the annular shoulder abuts, is, of all end faces of the valve-seat part, most proximal to the valve spring;
      (d) an edge of the tubular collar, which edge has the press fit against the circumferential surface of the elevation, is a terminating edge of the valve cage; and (e) the valve cage and the valve-seat part are structured such that when the valve cage and the valve-seat part are separate from each other, prior to the annular shoulder being arranged to abut against the end face of the elevation and without any pressure being radially applied to them, an inner diameter of the tubular collar is narrower than an outer diameter of the circumferential surface of the elevation.

2. The non-return valve as recited in claim 1, wherein the valve cage has a narrowing on a side of the shut-off member facing away from the valve seat, as a travel limitation for the shut-off member, the valve cage transitioning with the narrowing (i) from a first cylindrical tube-shaped section of the valve cage, which extends from a first axial edge of the narrowing in a first axial direction, (ii) to a second cylindrical tube-shaped section of the valve cage, which extends from a second axial edge of the narrowing in a second axial direction that is opposite the first axial direction.

3. The non-return valve as recited in claim 1, wherein the valve cage has beads running in a lift direction of the shut-off member that guide the shut-off member in the lift direction.

4. The non-return valve as recited in claim 1, wherein the valve cage has the passages that extend in the lift direction of the shut-off member, nearly up to the valve-cage annular shoulder, the passages being the cutouts in the wall of the valve cage and extending from the radial interior of the valve cage to the radial exterior of the valve cage.

5. The non-return valve as recited in claim 4, wherein, between at least two of the passages, the valve cage has at least one of the beads running in the lift direction of the shut-off member that guide the shut-off member in the lift direction.

6. The non-return valve as recited in claim 1, wherein the valve cage is a deep-drawn part.

7. The non-return valve as recited in claim 1, wherein the valve-seat part is a molded part.

8. The non-return valve as recited in claim 1, wherein the non-return valve has a filter on a side of the valve-seat part facing away from the valve cage.

9. The non-return valve as recited in claim 8, wherein the filter is bowl-shaped and/or has a mounting flange that is located in a depression in the valve-seat part.

10. The non-return valve as recited in claim 1, wherein the non-return valve is a preassembly unit.

11. The non-return valve as recited in claim 1, wherein the total height of the valve-seat part is not greater than approximately one third of the maximum diameter of the valve-seat part.

12. The non-return valve as recited in claim 1, wherein the end face of the elevation, against which the annular shoulder abuts, is, of all of the end faces of the valve-seat part, the most proximal to the valve spring.

13. The non-return valve as recited in claim 1, wherein the edge of the tubular collar, which edge has the press fit against the circumferential surface of the elevation, is the terminating edge of the valve cage.

14. The non-return valve as recited in claim 1, wherein the valve cage and the valve-seat part are structured such that when the valve cage and the valve-seat part are separate from each other, prior to the annular shoulder being arranged to abut against the end face of the elevation and without any pressure being radially applied to them, the inner diameter of the tubular collar is narrower than the outer diameter of the circumferential surface of the elevation.

15. A hydraulic block for a hydraulic modulator for a vehicle hydraulic-power brake system, comprising:
a non-return valve including:
a valve-seat part having a valve seat;
a shut-off member;
a valve spring which presses the shut-off member against the valve seat; and
a valve cage that is disposed on the valve-seat part, in which the shut-off member and the valve spring are located and which supports the valve spring;
wherein:
the valve-seat part has an elevation, and the valve cage has an annular shoulder which abuts against an end face of the elevation and which changes over at an outer periphery of the annular shoulder into a tubular collar that has a press fit with a circumferential surface of the elevation;
the hydraulic block has a recess as a non-return-valve mounting having an annular step against which the valve-seat part abuts outside the elevation; and
the non-return valve includes at least one of the following features (a)-(e):
(a) a total height of the valve-seat part is not greater than approximately one third of a maximum diameter of the valve-seat part;
(b) the valve cage has passages that extend in a lift direction of the shut-off member, nearly up to the valve-cage annular shoulder, the passages being cutouts in a wall of the valve cage and extending from a radial interior of the valve cage to a radial exterior of the valve cage;
(c) the end face of the elevation, against which the annular shoulder abuts, is, of all end faces of the valve-seat part, most proximal to the valve spring;
(d) an edge of the tubular collar, which edge has the press fit against the circumferential surface of the elevation, is a terminating edge of the valve cage; and
(e) the valve cage and the valve-seat part are structured such that when the valve cage and the valve-seat part are separate from each other, prior to the annular shoulder being arranged to abut against the end face of the elevation and without any pressure being radially applied to them, an inner diameter of the tubular collar is narrower than an outer diameter of the circumferential surface of the elevation.

16. The hydraulic block as recited in claim 15, wherein the non-return valve is disposed concentrically in the non-return-valve mounting.

* * * * *